(12) United States Patent
Padgett

(10) Patent No.: US 9,143,429 B2
(45) Date of Patent: Sep. 22, 2015

(54) IDENTIFYING AN EGRESS POINT TO A NETWORK LOCATION

(75) Inventor: Steven Padgett, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 269 days.

(21) Appl. No.: 13/407,066

(22) Filed: Feb. 28, 2012

(65) Prior Publication Data

US 2013/0223276 A1    Aug. 29, 2013

(51) Int. Cl.
   *H04L 12/751*    (2013.01)
   *H04L 12/717*    (2013.01)
   *H04L 12/723*    (2013.01)

(52) U.S. Cl.
   CPC ............... *H04L 45/02* (2013.01); *H04L 45/42* (2013.01); *H04L 45/50* (2013.01); *H04L 2212/0025* (2013.01)

(58) Field of Classification Search
None
See application file for complete search history.

(56) References Cited

U.S. PATENT DOCUMENTS

| | | | |
|---|---|---|---|
| 6,862,500 | B2 | 3/2005 | Tzamaloukas |
| 7,039,404 | B2 | 5/2006 | Das et al. |
| 7,417,950 | B2 | 8/2008 | Hofmeister et al. |
| 7,581,022 | B1 | 8/2009 | Griffin et al. |
| 7,584,298 | B2 | 9/2009 | Klinker et al. |
| 7,688,829 | B2 | 3/2010 | Guichard et al. |
| 7,864,669 | B2 | 1/2011 | Bonaventure et al. |
| 2005/0068933 | A1 | 3/2005 | Kokkonen et al. |
| 2007/0147363 | A1 | 6/2007 | Oswal et al. |
| 2008/0062891 | A1 * | 3/2008 | Van der Merwe et al. .... 370/254 |
| 2009/0092140 | A1 * | 4/2009 | Gibbons et al. .......... 370/395.31 |
| 2009/0254638 | A1 | 10/2009 | Spatscheck et al. |
| 2010/0316054 | A1 | 12/2010 | Xu et al. |
| 2011/0010449 | A1 | 1/2011 | Andrews et al. |
| 2011/0128969 | A1 * | 6/2011 | Scholl ............................ 370/411 |
| 2011/0235545 | A1 | 9/2011 | Subramanian et al. |
| 2012/0163190 | A1 * | 6/2012 | Jocha et al. ................ 370/241.1 |

FOREIGN PATENT DOCUMENTS

| | | |
|---|---|---|
| EP | 1089498 A2 | 4/2001 |
| WO | WO-2006011952 A2 | 2/2006 |

(Continued)

OTHER PUBLICATIONS

International Search Report and Written Opinion for Application No. PCT/US2013/027059 dated May 25, 2013.

*Primary Examiner* — Jason Mattis
*Assistant Examiner* — Adnan Baig
(74) *Attorney, Agent, or Firm* — Foley & Lardner LLP; Edward A. Gordon

(57) ABSTRACT

A method of identifying an egress point to a network location includes receiving a client connection from an external network (e.g., the internet) and retrieving an egress point identifier from an egress data source (e.g., a database, look-up table, hash table, data object etc.) for the received client connection. The egress data source stores egress point identifiers associated with at least one of an internet protocol address and a subnetwork. The method further includes binding the client connection to an egress point corresponding to the retrieved egress point identifier, encapsulating packets of data received from the client connection, and sending the encapsulated data packets through an instantiated network tunnel to the bound egress point. The method includes decapsulating the encapsulated data packets at least near the bound egress point. A default routing policy may then guide the data packets to the egress point.

29 Claims, 5 Drawing Sheets

(56) References Cited

FOREIGN PATENT DOCUMENTS

| WO | WO-2006102398 | A2 | 9/2006 |
| WO | WO-2008045255 | A2 | 4/2008 |
| WO | WO-2008114004 | A1 | 9/2008 |
| WO | WO-2008114007 | A1 | 9/2008 |
| WO | WO-2011000325 | A1 | 1/2011 |

* cited by examiner

IDENTIFYING AN EGRESS POINT TO A NETWORK LOCATION

TECHNICAL FIELD

This disclosure relates to methods of identifying an egress point to a network location.

BACKGROUND

In general, autonomous systems (AS) having networks under a common administrator may share a common routing policy for communication therebetween, such as border gateway protocol (BGP). Within each autonomous system, the routing protocol typically entails an interior gateway protocol (IGP), such as a link state protocol.

Link state protocol generally relies on a routing algorithm executed at each network node. Each node on the network advertises, throughout the network, links to neighboring nodes and provides a cost associated with each link, which can be based on any appropriate metric such as link bandwidth or delay and is typically expressed as an integer value. A link may have an asymmetric cost, that is, the cost in a first direction along a link may be different from the cost in a second, reverse direction. Based on the advertised information in the form of a link state packet (LSP) each node constructs a link state database (LSDB), which is a map of the entire network topology, and from that constructs generally a single route to each available node based on an appropriate algorithm such as, a shortest path first (SPF) algorithm. As a result, a spanning tree is constructed, rooted at the node and showing a communication path including intermediate nodes to each available destination node.

The results of the spanning tree can be stored in a routing information base (RIB) and based on these results the forwarding information base (FIB) or forwarding table is updated to control forwarding of packets appropriately. When there is a network change a link state packet representing the change is flooded through the network by each node adjacent the change, each node receiving the link state packet sends it to each adjacent node. As a result, when a data packet for a destination node arrives at a node the node identifies a route to that destination and forwards the packet to the next node along that route. The next node repeats this step and so forth.

SUMMARY

In computer networks, such as the Internet, a network of links (i.e., communication paths) and nodes, such as routers directing packets of data along one or more connected links, send packets of data from a source to a destination according to one or more routing protocols. A unique internet protocol (IP) address typically identifies elements in the network. In a relatively large provider network, multiple egress points may advertise a route to a specific destination. A default routing policy out of the provider network to that destination may include selecting only one egress point (assuming no load-balancing) based on network policies for routing egress traffic. Since many networks fail to accept advertisements less than 256 IP addresses in a block, an egress point may be chosen that is less efficient than another egress point to the same destination. The present disclosure provides a network system that can route egress traffic to part of a prefix, including individual IP addresses of that prefix. This allows selection of an efficient egress point for binding of a particular client connection.

One aspect of the disclosure provides a method of identifying an egress point to a network location. The method includes receiving a client connection from an external network (e.g., the internet) and retrieving an egress point identifier from an egress data source (e.g., a database, look-up table, hash table, data object, etc.) for the received client connection. The egress data source stores egress point identifiers associated with at least one of an internet protocol address and a subnetwork. The method further includes binding the client connection to an egress point corresponding to the retrieved egress point identifier, encapsulating packets of data received from the client connection, and sending the encapsulated data packets through an instantiated network tunnel to the bound egress point. The method includes decapsulating the encapsulated data packets at least near the bound egress point. A default routing policy may then guide the data packets to the egress point.

Implementations of the disclosure may include one or more of the following features. In some implementations, the method includes instantiating network tunnels of a provider network for each egress point having a corresponding egress point identifier stored by the egress data source. This may entail receiving an advertised tunnel endpoint from a decapsulator associated with each egress point (e.g., that is stored by the egress data source) and for each received tunnel endpoint advertisement, instantiating a network tunnel to the associated egress point. In some examples, egress points having egress point identifiers absent from the egress data source may not receive an instantiated network tunnel. Instead, data packets may be routed according to the default routing policy to those egress points. Additionally or alternatively, the method may include receiving an advertised tunnel endpoint from a decapsulator associated with each egress point, and for each received tunnel endpoint advertisement, configuring the associated decapsulator to terminate encapsulated data packets received through a network tunnel. In some implementations, the egress data source stores egress points typically passed over by the default routing policy for communicating data packets to a particular destination, even though those egress points may have certain advantages (e.g., performance advantages).

The method may include querying the egress data source for an egress point identifier associated with a destination of the received client connection. The destination includes at least one of an internet protocol address and a subnetwork. In some examples, the method includes querying the egress data source for an egress point identifier corresponding to an egress point satisfying a performance criteria, such as a threshold latency, a threshold bandwidth, a threshold cost, and/or a threshold usage.

In some implementations, the method includes encapsulating the data packets with received tunnel label information, such as a network tunnel identifier, a tunnel type, and/or an egress point identifier. The encapsulated data packets may be sent out into the provider network which routes the data packets to a particular egress point via a network tunnel based on the tunnel label information.

When the egress data source fails to provide an egress point identifier for the received client connection, the method may include sending the data packets received from the client connection according to the default network routing protocol. The default network routing protocol can direct the data packets to an egress point for delivery to the destination.

Another aspect of the disclosure provides a network system that includes an egress data source storing egress point identifiers associated with at least one of an internet protocol address and a subnetwork. The network system also includes a tunnel manager instantiating network tunnels of a provider network for each egress point having a corresponding egress point identifier stored by the egress data source. A connection manager communicates with the egress data source and the tunnel manager. The connection manager receives a client connection from an external network, retrieves an egress point identifier from the egress data source for the received client connection, and binds the client connection to an egress point corresponding to the retrieved egress point identifier. The connection manager also encapsulates packets of data received from the client connection and sends the encapsulated data packets through an instantiated network tunnel to the bound egress point. A decapsulator decapsulates the encapsulated data packets at least near the egress point.

In some implementations, the tunnel manager receives a tunnel end point advertisement from a decapsulator associated with each egress point and for each received tunnel endpoint advertisement, instantiates a network tunnel to the associated egress point. Additionally or alternatively, the tunnel manager receives a tunnel end point advertisement from a decapsulator associated with each egress point, and for each received tunnel endpoint advertisement, configures the associated decapsulator to terminate encapsulated data packets received through a network tunnel. The tunnel manager may provide tunnel label information, such as a network tunnel identifier, a tunnel type, and/or an egress point identifier, to the connection manager, which may encapsulate the data packets with the tunnel label information.

The egress data source may store at least one performance factor, such as latency, bandwidth, cost, and/or usage, for association with at least one egress point. When the egress data source fails to provide an egress point identifier for the received client connection, the connection manager may send the data packets received from the client connection according to a default network routing protocol. The data packets can be routed through the provider network according to the default network routing protocol to an egress point, which can be an egress router.

In yet another aspect of the disclosure, a computer program product encoded on a computer readable storage medium includes instructions that when executed by a data processing apparatus cause the data processing apparatus to perform operations that include receiving a client connection from an external network and retrieving an egress point identifier from an egress data source for the received client connection. The egress data source stores egress point identifiers associated with at least one of an internet protocol address and a subnetwork. The operations further include binding the client connection to an egress point corresponding to the retrieved egress point identifier, encapsulating packets of data received from the client connection, and sending the encapsulated data packets through an instantiated network tunnel to the bound egress point. The operations also include decapsulating the encapsulated data packets at least near the bound egress point.

In some implementations, the operations include instantiating network tunnels of a provider network for each egress point having a corresponding egress point identifier stored by the egress data source. Accordingly, egress points having egress point identifiers absent from the egress data source may not have dedicated network tunnels instantiated. In some examples, the operations include receiving an advertised tunnel endpoint from a decapsulator associated with each egress point and for each received tunnel endpoint advertisement, instantiating a network tunnel to the associated egress point. Additionally or alternatively, the operations may include receiving an advertised tunnel endpoint from a decapsulator associated with each egress point, and for each received tunnel endpoint advertisement, configuring the associated decapsulator to terminate encapsulated data packets received through a network tunnel.

The operations may include querying the egress data source for an egress point identifier associated with a destination of the received client connection. The destination may include at least one of an internet protocol address and a subnetwork. Additionally or alternatively, the operations may include querying the egress data source for an egress point identifier corresponding to an egress point satisfying a performance criteria, such as a threshold latency, a threshold bandwidth, a threshold cost, and/or a threshold usage. When the egress data source fails to provide an egress point identifier for the received client connection, the operations may include sending the data packets received from the client connection according to a default network routing protocol.

In some implementations, the operations include encapsulating the data packets with received tunnel label information, such as a network tunnel identifier, a tunnel type, and/or an egress point identifier. A tunnel manager of the provider network may use the tunnel label information to monitor a status or location of the encapsulated data packets.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
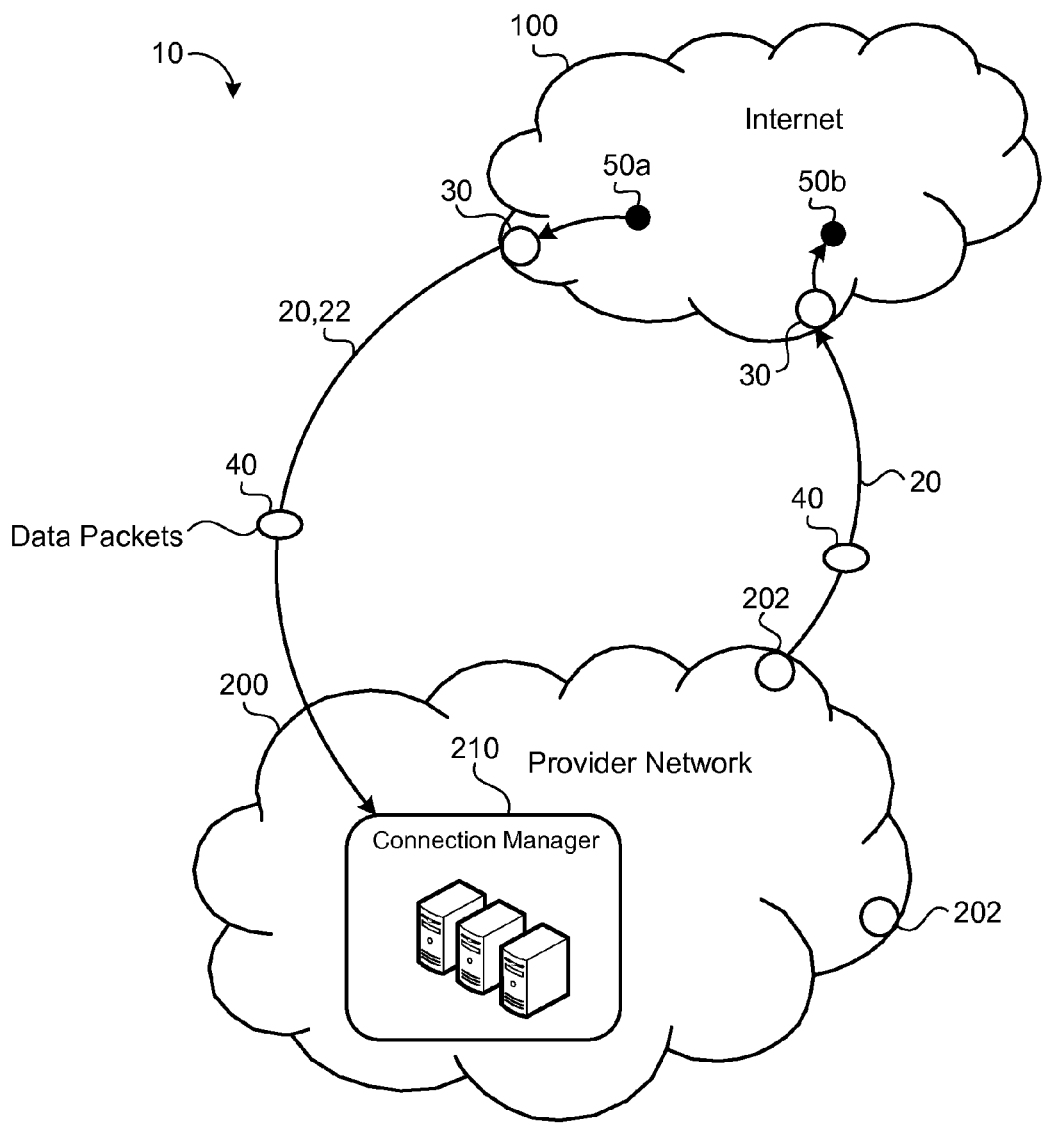
FIG. 1 is a schematic view of an exemplary network system.

Referring to FIG. 1, in some implementations, a network system 10 may include an external network 100, such as the Internet or a portion thereof, in communication with a provider network 200. The network system 10 may include a network of communication paths 20 (also referred to as links or connections) and nodes 30 (e.g., routers directing packets of data along one or more connected links) that send packets 40 of data from a source 50*a* to a destination 50*b* according to one or more routing protocols. A unique internet protocol (IP) address typically identifies a link 20 or a node 30 in the network system 10. The provider network 200 may provide access to and/or direct traffic about the external network 100.

One possible routing protocol for the network system 10 and/or the external network 100 is border gateway protocol (BGP). Border gateway protocol routes data between autonomous systems (AS) having networks under a common administrator and sharing a common routing policy. Routers adhering to border gateway protocol generally exchange full routing information during a connection session, for example, using transmission control protocol (TCP), allowing inter-autonomous system routing. The information exchanged may include various attributes including a next-hop attribute. For example, where a BGP router advertises a connection to a network in a form of an IP address prefix, the next-hop attribute includes the IP address used to reach the BGP router. Within each autonomous system the routing protocol typically includes an interior gateway protocol (IGP) that may include a link state protocol such as open shortest path first (OSPF) or intermediate system-intermediate system (IS-IS).

The provider network 200 includes a connection manager 210 that may route data packets 40 received from sources 50a to corresponding destinations 50bs. The connection manager 210 may execute on at least one computing device 212, such as a server, in communication with the external network 100. Moreover, the connection manager 210 may reside on the provider network 200. When the connection manager 210 receives a client connection 22 from a source 50a (e.g., a client of the external network 100), the connection manager 210 may determine an egress point 202 of the provider network 200 for binding with the client connection 22 to send data packets 40 received from the source 50a to the corresponding destination 50b. In some implementations, rather than relying on the default network routing protocol to determine an egress point 202 for data packets 40 of the client connection 22, the connection manager 210 can choose a specific communication path 20 to the destination 50b. This allows the connection manager 210 to use a pre-selected communication path 20 that may differ from a communication path 20 chosen by the default network routing protocol. As a result, certain high value traffic can be directed along certain communication paths 20 using the egress points stored in the egress data source 220. Moreover, rather than relying on a link state database (LSDB) stored at an egress point router (for link state protocol scenarios) for all or any data traffic, the connection manager 210 can execute on a separate computing device, such as a server, having relatively greater computer processing and memory capabilities.

The egress point 202 may include one or more egress routers 204. Routers 204 generally provide logical or physical borders between subnets 306 and manage traffic between the subnets 306. Each subnet 306 can be served by a designated default router, but may include multiple physical Ethernet segments interconnected by network switches or network bridges.

Figure 3:
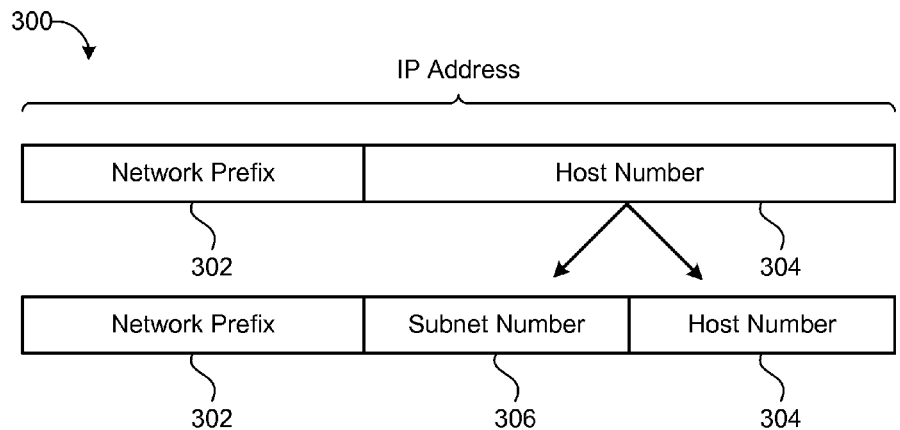
FIG. 3 is a schematic view of an internet protocol address.

FIG. 3 illustrates an exemplary IP address 300. IP networks can be divided into subnetworks in both IPv4 and IPv6. For this purpose, an IP address 300 generally has two parts: a network prefix 302 and a host identifier 304, or interface identifier (IPv6). For IPv4, a subnet mask may be used to divide the IP address 300 into a subnetwork 306 portion and the host identifier 304.

A subnetwork 306, or subnet, is generally a subdivision of an IP network. Subnetting can be the process of designating some high-order bits from the host identifier 304 of the IP address 300 and grouping them with a network mask to form a subnet mask. This divides the IP network into smaller subnetworks 306. All computing devices belonging to a subnetwork 306 can be addressed with a common, identical, most-significant bit-group in their IP addresses 300.

Referring again to FIG. 2, multiple egress points 202 can advertise a communication path 20 (e.g., a link) to a specific destination 50b. Moreover, in some instances, the connection manager 210 may accept advertisements only in blocks of IP addresses 300. A routing policy for routing egress traffic may cause the connection manager 210 to chose only one egress point 202 (assuming no load-balancing) for directing data packets 40 out of the provider network 200 to a prefix 302 of that destination 50b, even though multiple valid egress points 202 may exist. For example, one egress point 102 may have relatively low latency for sending data packets 40 to a first set of IP addresses 300, while another egress point 102 may have relatively low latency for sending data packets 40 to a second set of IP addresses 300.

Figure 2:
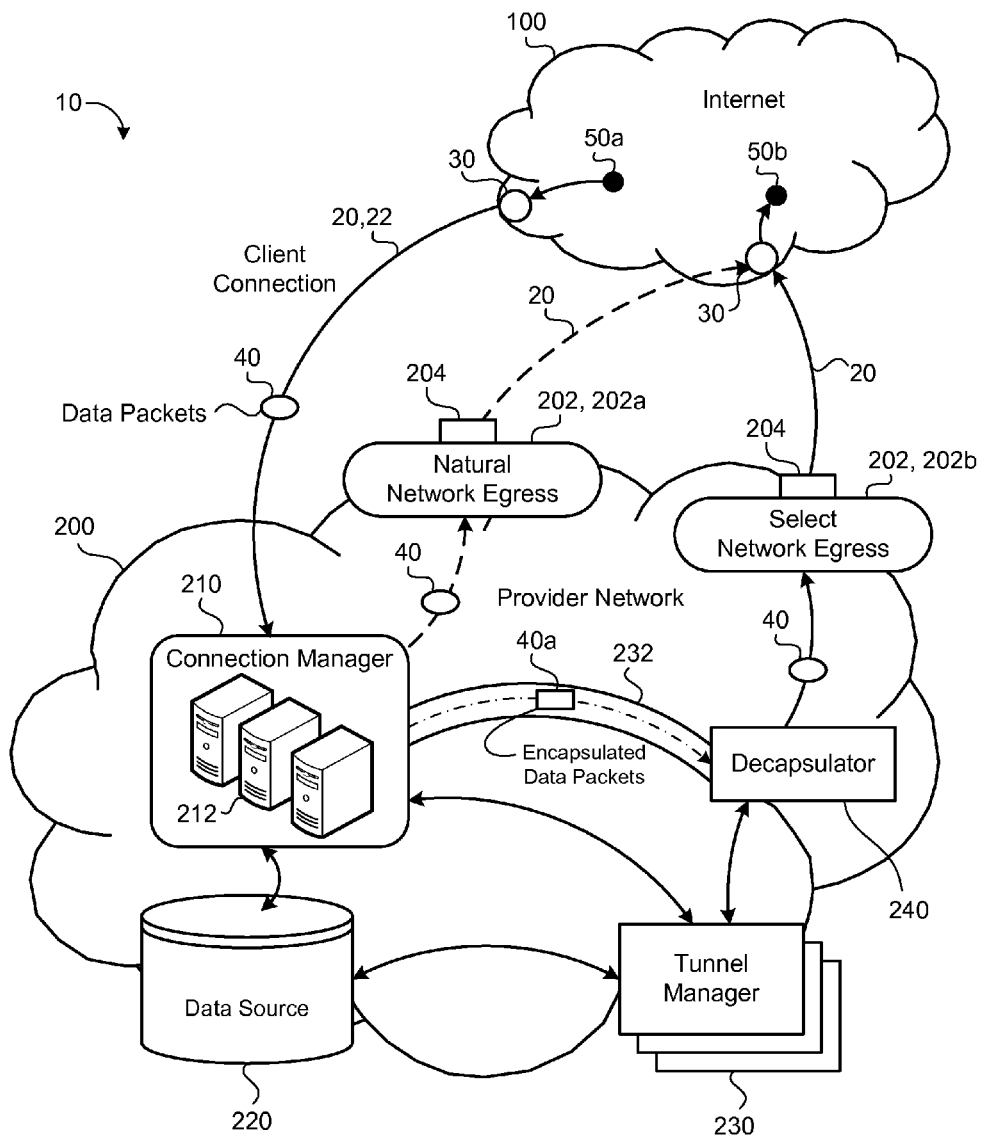
FIG. 2 is a schematic view of an exemplary network system capable of directing data traffic to an internet protocol address and/or a subnetwork.
Figure 4:
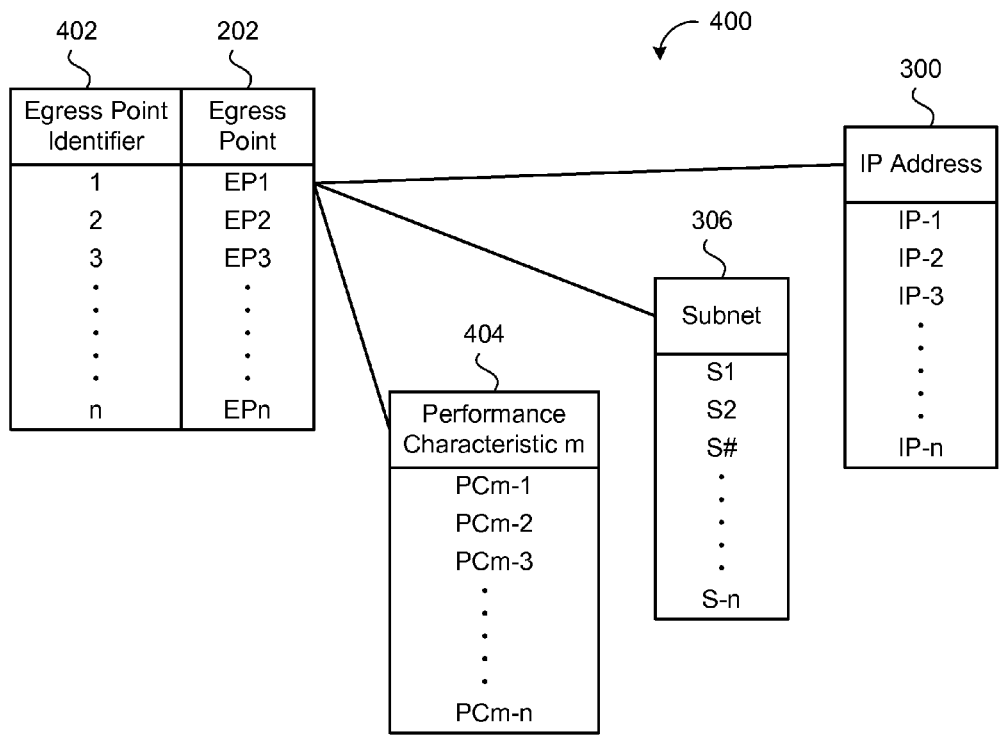
FIG. 4 is a schematic view of an exemplary egress data source.

Referring to FIGS. 2-4, in some implementations, the provider network 200 routes egress traffic to part of a prefix 302, i.e., a subnetwork 306, including individual IP addresses 300 of that prefix 302. This allows selection of an efficient egress point 202 for binding of a particular client connection 22.

In some implementations, the connection manager 210 communicates with an egress data source 220 to select an egress point 202 for binding with a received client connection 22, rather than relying solely on natural network routing. The egress data source 220 stores egress point identifiers 402 of corresponding egress points 202, which are associated with internet protocol (IP) addresses 300 and/or subnetworks 306. Each egress point 202 may be associated (via its egress point identifier) with one or more IP addresses 300 and/or subnetworks 306. The associations can be determined based on at least one performance factor 404, such as latency, bandwidth, cost, and/or usage. Moreover, the egress data source 220 may store at least one performance factor for association with at least one egress point 202. The connection manager 210 may query the egress data source 220 by IP address 300, subnetwork 306 and/or performance factor 404. For example, the connection manager 210 may query the egress data source 220 for an egress point identifier 402 corresponding to an egress point 202 satisfying a performance criteria that includes a threshold latency, a threshold bandwidth, a threshold cost, and/or a threshold usage.

FIG. 4 illustrates an exemplary relationship model 400 providing a possible one-to-many relationship between egress points 202, each having an egress point identifier 402 (e.g., unique identifier), and IP addresses 300, subnetworks 306, and/or performance factors 404. The egress data source 220 may be a relational database, allowing flexible management and storage of information associated with the egress points 202.

Referring again to FIG. 2, the connection manager 210 communicates with a tunnel manager 230 for routing data packets 40 from the client connection 22 to the destination 50b. The tunnel manager 230 may instantiate network tunnels 232 of the provider network 200, for example, for each egress point 202 having a corresponding egress point identifier 402 stored by the egress data source 220. In some implementations, the tunnel manager 230 instantiates network tunnels 232 only for egress points 202 that would not be selected naturally by the default network routing protocol. Natural egress points 202a, those normally chosen by the network routing protocol, may not need network tunnels 232, since data packets 40 can move to those egress points 220a under the normal (default) routing protocol. On the other hand, pre-selected egress points 202b, such as those stored in the egress data source 220, need network tunnels 232 to direct data packets 40 to those locations against the normal routing protocol. As such, in some examples, the tunnel manager 230 may establish network tunnels 232 only for egress points 202, 202b specified by the egress data source 220.

When the connection manager 210 receives a client connection 22 from the external network 100, the connection manager 210 may retrieve an egress point identifier 402 from the egress data source 220 based on the IP address 300 and/or the subnetwork 306 of the corresponding destination 50b of the client connection 22. The connection manager 210 binds the client connection 22 to an egress point 202 corresponding to the retrieved egress point identifier 402. The connection manager 210 encapsulates packets 40 of data received from the client connection 22 and sends the encapsulated data packets 40a through an instantiated network tunnel 232 for the bound egress point 202. The connection manager 210 may use multi-protocol label switching (MPLS), generic routing encapsulation (GRE), or a virtual local area network (VLAN), for example, to encapsulate the data packets 40 and send the encapsulated data packets 40a across the provider network 200 to the bound egress point 202. MPLS directs data from one network node 30 to the next based on short path labels rather than long network addresses, avoiding complex lookups in a routing table.

When individual data packets 40 need binding to a specific egress point 202, the connection manager 210 may support delayed binding and migration of in-process flows between egress points 202. In some examples, the connection manager 210 executes an input/output control request on an existing socket to have a kernel start encapsulating data packets 40 sent through that socket to the bound egress point 202.

In some implementations, a decapsulator 240 terminates the tunneled traffic at the egress point 202. The decapsulator 240 decapsulates encapsulated data packets 40a sent by the connection manager 210 through a network tunnel 232 to the bound egress point 202. The decapsulated data packets 40 are forwarded in the provider network 200 following natural network routing to the egress point 202. Each decapsulator 240 may advertise a tunnel endpoint (e.g., associated with an egress point 202). The tunnel manager 230 may configure the decapsulator 240 associated with each received tunnel endpoint advertisement to terminate encapsulated data packets 40a received through a network tunnel 232. In some examples, the decapsulator 240 is part of a network node 30 (e.g., a router), while in other examples, the decapsulator 240 is a specialized component communicating with the tunnel manager 230 and/or the egress point 202. The provider network 200 may include multiple decapsulators 240, each of which may be associated with multiple network tunnels 232 aggregated by groups of servers in a given location. A single network tunnel 232 can be used by several servers to communicate with many clients on various external networks 100.

In some examples, the provider network 200 does not need to send the encapsulated data packets 40a completely to the bound egress point 202. Instead, the encapsulated data packets 40a may simply reach a threshold distance near the egress point 202, where natural network routing directs the encapsulated data packets 40a to a particular egress point 202 or a particular router 204 at the egress point 202.

The tunnel manager 230 may receive tunnel end point advertisements from decapsulators 240 associated with the egress points 202 and instantiates network tunnels 232 to each egress point 202. Moreover, the tunnel manager 230 may provide tunnel information to the connection manager 210, which may use the tunnel information for encapsulating the data packets 40. In some examples, the tunnel information includes a tunnel identifier, a tunnel type, and/or an egress point identifier for an associated network tunnel 232. When the connection manager 210 sends encapsulated data packets 40a through a network tunnel 232, the tunnel manager 230 or the connection manager 210 may monitor the network tunnel 232 to verify delivery of the encapsulated data packets 40a. An inner header of the encapsulated data packets 40a may have a destination IP address 300 for a monitoring object, such as an IP address 300 for the tunnel manager 230 or the connection manager 210, allowing the monitoring object to check on the movement of the encapsulated data packets 40a and verify delivery the encapsulated data packets 40a through the network tunnel 232 to the egress point 202.

Figure 5:
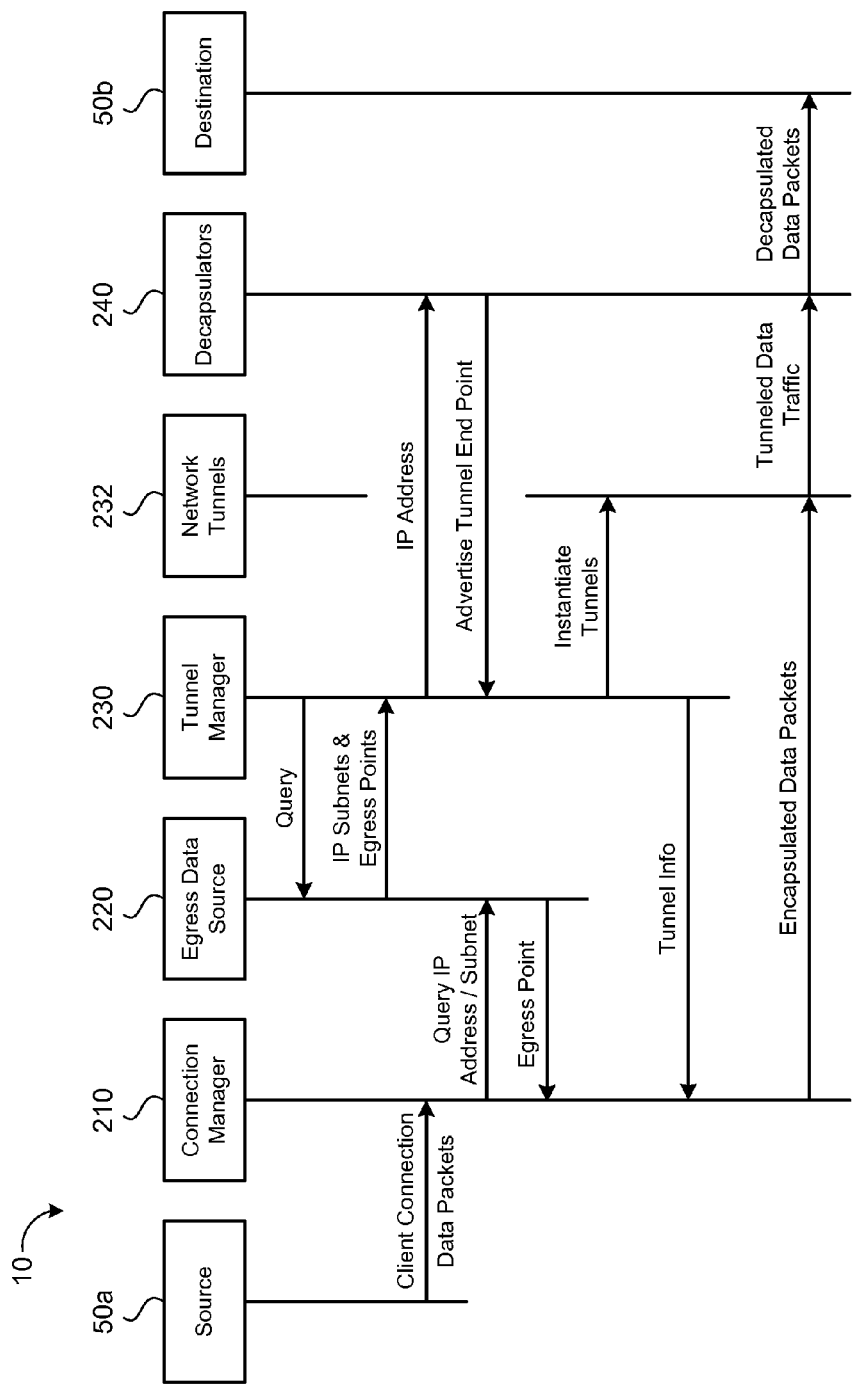
FIG. 5 is a schematic view of an exemplary network system.

Referring to FIGS. 2 and 5, in some implementations, the tunnel manager 230 queries the egress data source 220 for IP subnets 306 and/or IP addresses 300 and their associated egress points 202. The tunnel manager 230 may solicit advertisements from the queried egress points 202 (e.g., of corresponding network tunnel end points) and then instantiate a network tunnel 232 to each egress point 202. The tunnel manager 230 may communicate tunnel information to the connection manager 210, such as encapsulation and/or label information, tunnel identifier, corresponding egress point identifier, etc.

When the connection manager 210 receives a client connection 22 from a source 50a (e.g., a client) on an external network 100, the connection manager 210 queries the egress data source 220 for an egress point 202 corresponding to a destination 50b of the client connection 22. If the egress data source 220 does not have any egress points 202 associated with the destination 50b (e.g., returns an empty recordset for the query), the connection manager 210 may respond to the source 50a using natural network routing. In this case, the data packets 40 move through the provider network 200 using natural network routing to a natural egress point 202a, which may be less efficient than a pre-selected egress point 202b stored in the egress data source 220 and associated with that destination 50b.

If the egress data source 220 returns an egress point identifier 402 to a pre-selected egress point 202b, the connection manger 210 may cross-reference the egress point identifier 402 with the tunnel information received from the tunnel manger 230 for identifying the appropriate encapsulation/label information. The connection manager 210 encapsulates the data packets 40 received from the source 50a and sends the encapsulated data packets 40a into the provider network 200 through an instantiated network tunnel 232 to the decapsulator 240 associated with the egress point 202. The decapsulator 240 decapsulates the encapsulated data packets 40a and forwards the data packets 40 into the provider network 200 at least near the pre-selected egress point 202b, where natural network routing can guide the data packets to the pre-selected egress point 202b.

In some implementations, a first percentage of data flows to various destinations 50b are not encapsulated and are allowed to egress naturally, according to the default network routing protocol. These destinations 50b do not have associated egress points 202 stored in the egress data source 220. While a second percentage of data flows on the provider network 200 (such as high value flows) having destinations 50b accounted for in the egress data source 220 may be encapsulated for travel through a network tunnel 232 to a pre-selected egress point 202b. If a pre-selected egress point 202b ceases to exist, the data may flow using the default network routing protocol.

Figure 6:
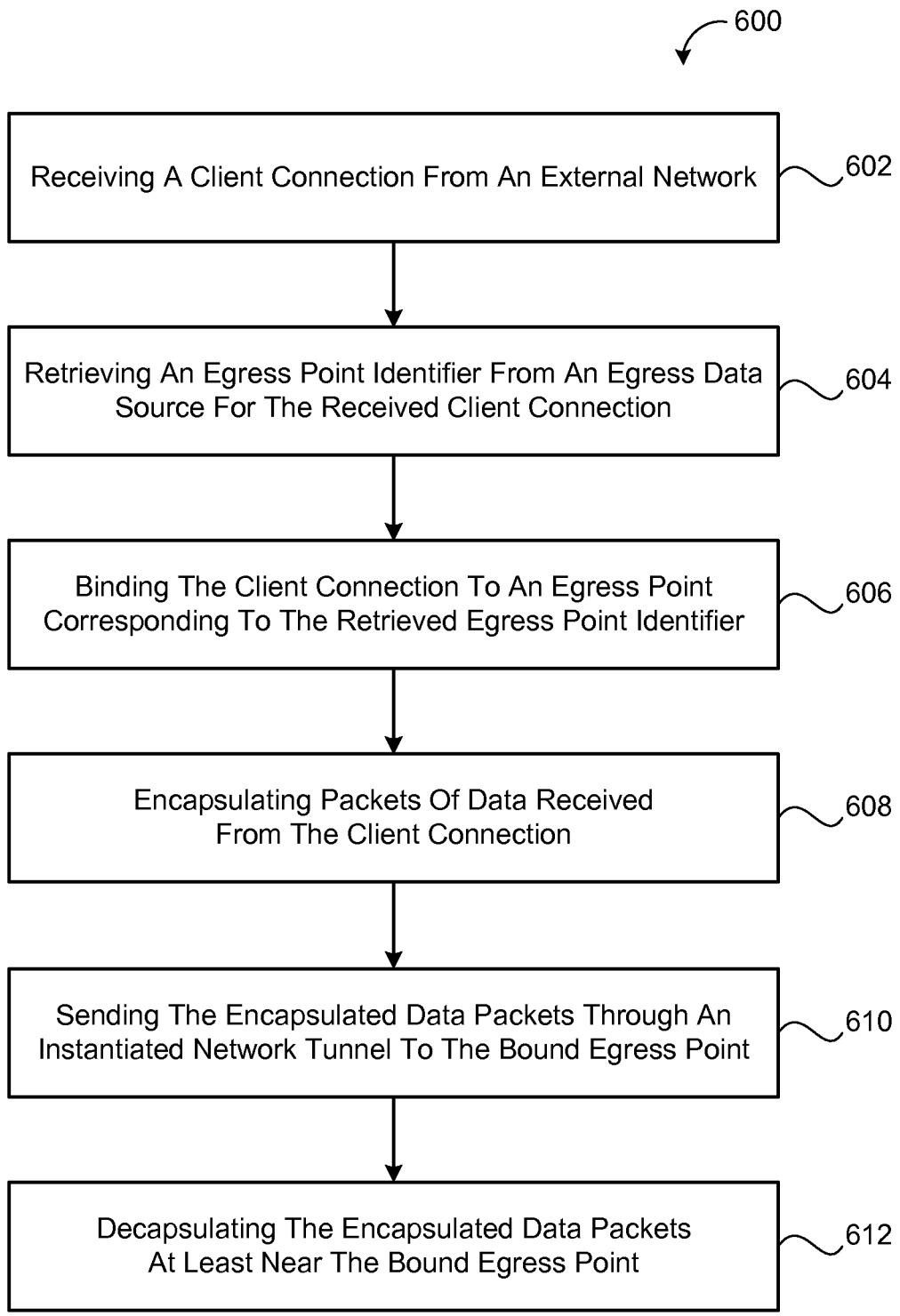
FIG. 6 provides an exemplary arrangement of operations for a method of identifying an egress point to a network location.

FIG. 6 provides an exemplary arrangement 600 of operations for a method of identifying an egress point 202 to a network location. The method includes receiving 602 a client connection 22 from an external network 100 and retrieving 604 an egress point identifier 402 from the egress data source 220 for the received client connection 22. The egress data source 220 may store egress point identifiers 402 associated with at least one of an IP address 300 and a subnetwork 306. The method further includes binding 606 the client connection 22 to an egress point 202 corresponding to the retrieved egress point identifier 402. The method includes encapsulating 608 data packets 40 received from the client connection 22, sending the encapsulated data packets 40a through an instantiated network tunnel 232 to the bound egress point 202, and decapsulating the encapsulated data packets 40a at least near the bound egress point 202.

In some implementations, the method includes instantiating network tunnels 232 of the provider network 200 (e.g., via the tunnel manager 230) for each egress point 202 having a corresponding egress point identifier 402 stored by the egress data source 220. In some examples, this includes receiving an advertised tunnel endpoint from a decapsulator 240 associated with each egress point 202 and for each received tunnel endpoint advertisement, instantiating a network tunnel 232 to the associated egress point 202.

The method may include querying the egress data source 220 for an egress point identifier 402 associated with a destination 50b of the received client connection 22. The destination 50b can be an internet protocol address 300 and/or a subnetwork 306. In additional implementations, the method includes querying the egress data source 220 for an egress point identifier 402 corresponding to an egress point 202 satisfying a performance criteria, which may include a threshold latency, a threshold bandwidth, a threshold cost, and/or a threshold usage. Moreover, the method may include encapsulating the data packets 40 with tunnel label information received from the tunnel manager 230, such as a network tunnel identifier, a tunnel type, and/or an egress point identifier.

When the egress data source 220 fails to provide an egress point identifier 402 for the received client connection 22, the method may include sending the data packets 40 received from the client connection 22 according to a default network routing protocol. The default network routing protocol can route the data packets 40 to another egress point 202 for delivery to the destination 50b.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Aspects of the subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

Implementations of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular implementations of the invention. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

What is claimed is:

1. A method of identifying an egress point to a network location, the method comprising:
   receiving a client connection containing packets of data from an external network;
   retrieving an egress point identifier from an egress data source for the received client connection, the egress data source storing egress point identifiers associated with at least one of an internet protocol address and a subnetwork;
   binding the client connection to a pre-selected egress point corresponding to the retrieved egress point identifier, the pre-selected egress point different from another egress point naturally selected by a default network routing protocol;
   encapsulating the packets of data received from the client connection;
   instantiating a network tunnel to an intermediate egress point located a threshold distance from the bound pre-selected egress point;
   sending the encapsulated data packets through the instantiated network tunnel to the intermediate egress point;
   decapsulating the encapsulated data packets at the intermediate egress point; and
   after decapsulating the encapsulated data packets, routing the decapsulated packets from the intermediate egress point to the bound pre-selected egress point using the default network routing protocol.

2. The method of claim 1, further comprising instantiating network tunnels of a provider network for each pre-selected egress point having a corresponding egress point identifier stored by the egress data source.

3. The method of claim 2, further comprising:
   receiving an advertised tunnel endpoint from a decapsulator associated with each pre-selected egress point; and
   for each received tunnel endpoint advertisement, instantiating a network tunnel to the associated pre-selected egress point.

4. The method of claim 1, further comprising:
   receiving an advertised tunnel endpoint from a decapsulator associated with each pre-selected egress point; and
   for each received tunnel endpoint advertisement, configuring the associated decapsulator to terminate encapsulated data packets received through a network tunnel.

5. The method of claim 1, further comprising querying the egress data source for an egress point identifier associated with a destination of the received client connection, the destination comprising at least one of an internet protocol address and a subnetwork.

6. The method of claim 1, further comprising querying the egress data source for an egress point identifier corresponding to a pre-selected egress point satisfying a performance criteria.

7. The method of claim 6, wherein the performance criteria comprises at least one of a threshold latency, a threshold bandwidth, a threshold cost, and a threshold usage.

8. The method of claim 1, further comprising encapsulating the data packets with received tunnel label information.

9. The method of claim 8, wherein the tunnel label information comprises at least one of a network tunnel identifier, a tunnel type, and an egress point identifier.

10. The method of claim 1, further comprising sending the data packets received from the client connection according to a default network routing protocol when the egress data source fails to provide an egress point identifier for the received client connection.

11. A network system comprising:
   an egress data source storing egress point identifiers associated with at least one of an internet protocol address and a subnetwork;
   a tunnel manager instantiating network tunnels of a provider network for each pre-selected egress point having a corresponding egress point identifier stored by the egress data source;

a connection manager in communication with the egress data source and the tunnel manager, the connection manager:
- receiving a client connection containing packets of data from an external network;
- retrieving an egress point identifier from the egress data source for the received client connection;
- binding the client connection to a pre-selected egress point corresponding to the retrieved egress point identifier, the pre-selected egress point different from another egress point naturally selected by a default network routing protocol;
- encapsulating the packets of data received from the client connection;
- instantiating a network tunnel to an intermediate egress point located a threshold distance from the bound pre-selected egress point; and
- sending the encapsulated data packets through an instantiated network tunnel to the intermediate egress point; and a decapsulator decapsulating the encapsulated data packets at the intermediate egress point;

wherein after decapsulating the encapsulated data packets at the decapsulator, the connection manager routes the decapsulated data packets from the decapsulator to the bound pre-selected egress point using the default network routing protocol.

12. The network system of claim 11, wherein the tunnel manager:
- receives a tunnel end point advertisement from a decapsulator associated with each selected egress point; and
- for each received tunnel endpoint advertisement, instantiates a network tunnel to the associated pre-selected egress point.

13. The network system of claim 11, wherein the tunnel manager:
- receives a tunnel end point advertisement from a decapsulator associated with each pre-selected egress point; and
- for each received tunnel endpoint advertisement, configures the associated decapsulator to terminate encapsulated data packets received through a network tunnel.

14. The network system of claim 11, wherein the tunnel manager provides tunnel label information to the connection manager, the connection manager encapsulating the data packets with the tunnel label information.

15. The network system of claim 14, wherein the tunnel label information comprises at least one of a network tunnel identifier, a tunnel type, and an egress point identifier.

16. The network system of claim 11, wherein the egress data source stores at least one performance factor for association with at least one pre-selected egress point.

17. The network system of claim 16, wherein the performance factor comprises at least one of latency, bandwidth, cost, and usage.

18. The network system of claim 11, wherein the connection manager sends the data packets received from the client connection according to a default network routing protocol when the egress data source fails to provide an egress point identifier for the received client connection.

19. The network system of claim 11, wherein the pre-selected egress point comprises an egress router.

20. A computer program product encoded on a non-transitory computer readable storage medium comprising instructions that when executed by a data processing apparatus cause the data processing apparatus to perform operations comprising:
- receiving a client connection containing packets of data from an external network;
- retrieving an egress point identifier from an egress data source for the received client connection, the egress data source storing egress point identifiers associated with at least one of an internet protocol address and a subnetwork;
- binding the client connection to a pre-selected egress point corresponding to the retrieved egress point identifier, the pre-selected egress point different from another egress point naturally selected by a default network routing protocol;
- encapsulating the packets of data received from the client connection;
- instantiating a network tunnel to an intermediate egress point located a threshold distance from the bound pre-selected egress point;
- sending the encapsulated data packets through the instantiated network tunnel to the intermediate egress point;
- decapsulating the encapsulated data packets at the intermediate egress point; and
- after decapsulating the encapsulated data packets, routing the decapsulated packets from the intermediate egress point to the bound pre-selected egress point using the default network routing protocol.

21. The computer program product of claim 20, wherein the performed operations further comprise instantiating network tunnels of a provider network for each selected egress point having a corresponding egress point identifier stored by the egress data source.

22. The computer program product of claim 20, wherein the performed operations further comprise:
- receiving an advertised tunnel endpoint from a decapsulator associated with each selected egress point; and
- for each received tunnel endpoint advertisement, instantiating a network tunnel to the associated pre-selected egress point.

23. The computer program product of claim 20, wherein the performed operations further comprise:
- receiving an advertised tunnel endpoint from a decapsulator associated with each pre-selected egress point; and
- for each received tunnel endpoint advertisement, configuring the associated decapsulator to terminate encapsulated data packets received through a network tunnel.

24. The computer program product of claim 20, wherein the performed operations further comprise querying the egress data source for an egress point identifier associated with a destination of the received client connection, the destination comprising at least one of an internet protocol address and a subnetwork.

25. The computer program product of claim 20, wherein the performed operations further comprise querying the egress data source for an egress point identifier corresponding to a pre-selected egress point satisfying a performance criteria.

26. The computer program product of claim 25, wherein the performance criteria comprises at least one of a threshold latency, a threshold bandwidth, a threshold cost, and a threshold usage.

27. The computer program product of claim 20, wherein the performed operations further comprise encapsulating the data packets with received tunnel label information.

28. The computer program product of claim 27, wherein the tunnel label information comprises at least one of a network tunnel identifier, a tunnel type, and an egress point identifier.

29. The computer program product of claim 20, wherein the performed operations further comprise sending the data packets received from the client connection according to a default network routing protocol when the egress data source fails to provide an egress point identifier for the received client connection.

* * * * *